United States Patent [19]
Antal et al.

[11] 3,787,698
[45] Jan. 22, 1974

[54] RECORDING OF FAST NEUTRON IMAGES

[75] Inventors: John J. Antal, Framingham; Robert L. Becker, Ashland, both of Mass.

[73] Assignee: The United States of America as represented by the Secretary of the Army, Washington, D.C.

[22] Filed: Oct. 11, 1972

[21] Appl. No.: 296,685

[52] U.S. Cl. .............................. 250/473, 250/477
[51] Int. Cl. ......................................... G03b 41/16
[58] Field of Search .......... 250/65 R, 65 F, 83.3 PH

[56] References Cited
UNITED STATES PATENTS
2,933,605   4/1960   Rose .............................. 250/83 PH
3,235,728   2/1966   Berger ............................ 250/65 R Primary Examiner—James W. Lawrence
Assistant Examiner—C. E. Church
Attorney, Agent, or Firm—Edward J. Kelly; Herbert Berl

[57] ABSTRACT

The formation of a permanent image of a fast neutron beam on cellulose nitrate film. The cellulose nitrate film is positioned between a converter film made of a suitable hydrogen-containing material, such as polyethylene, and the assembly attached to a back plate of aluminum. The neutron exposure is made with the neutrons impinging on the uncovered polyethylene face. Elastic scattering of fast neutrons by the nuclei of the hydrogen atoms in the polyethylene film produces protons which travel into the cellulose nitrate, leaving sensitized spikes therein. The cellulose nitrate film is etched by suspending in a sodium hydroxide solution and the image on the dry film viewed by transmitted light with the light source off the viewing axis.

4 Claims, 1 Drawing Figure

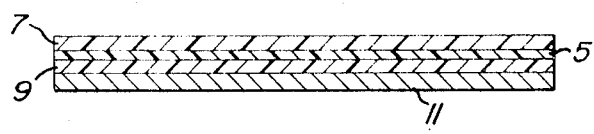

RECORDING OF FAST NEUTRON IMAGES

This invention relates to a radiation detection material for recording fast neutron images such as those required for radiography in the presence of other interfering radiations such as gamma rays and thermal neutrons which are generally emitted by fast neutron sources.

The analysis of certain items by etch-track techniques following irradiation has been in use for several years. The method of detection generally comprises counting individual etch pits in the plastic under a microscope. The present method is an extension of the prior method in that an image of a neutron beam is visible on the plastic to the unaided eye when light scattered from the etched surface is viewed.

It is an object of the present invention to provide and disclose a novel composition of matter comprising a cellulose nitrate film positioned between a hydrogen-containing film and a supporting component.

It is a further object of the present invention to provide and disclose the utilization of a composition of matter consisting of a cellulose nitrate film positioned between a hydrogen-containing film and a supporting plate for recording fast neutron images.

It is a further object of the invention to provide and disclose a method for recording fast neutron images on cellulose nitrate film whereby elastic scattering of fast neutrons by the nuclei of the hydrogen atom in a polyethylene film positioned on top of a cellulose nitrate film produces protons which travel into the cellulose nitrate, leaving sensitized spikes therein.

Other objects and fuller understanding of the invention may be had by referring to the following description and claims taken in conjunction with the accompanying drawing which shows a sectional view of the film.

The general process is to have the fast neutrons generate particles (or ions) within the plastic itself or within a converter film in contact with the plastic through nuclear interaction with the film being so arranged that the generated particles pass into the plastic and are there depleted of their kinetic energy in creating radiation damage spikes on an atomic scale, which are chemically more active than the undisturbed plastic material. With the proper choice of plastic composition and proper care in casting the plastic into a shell or film, the plastic so irradiated by these particles, can be treated by bathing in a caustic solution to form pits on one or both surfaces of the plastic film in sufficient numbers and with enough contrast between unirradiated and irradiated areas that an image of the neutron beam is visible on the plastic to the unaided eye when light scattered from the etched surface is viewed. Photographic prints of the etched neutron pattern in the plastic may be made with optical techniques which emphasize the rendering of the scattered light image rather than transmitted light image. Some film may be rather than transmitted light image. Some film may be treated with pigments for viewing by transmitted light. The image rendered by this process is a true fast neutron image since the particles which activate the plastic cannot be generated by lower energy (thermal) neutrons or gamma rays, which are normally present in the large doses from all commonly-known fast neutron sources.

A cassette is prepared by dissolving purified cellulose nitrate in a sufficient amount of amyl acetate to form a mildly viscous liquid and cast into a film by spreading on an unblemished glass surface, utilizing a spreader in order to minimize the retention by the film surface of minute bubbles and other defects. The film is allowed to air dry until a substantial portion of the amyl acetate has evaporated, at which point the film is placed in an oven maintained at a temperature of around 55°C for a period of several hours. The produced cellulose nitrate film will have a thickness of about 0.001 inches, which is sufficient for good proton detection and for mechanical strength while handling.

The cellulose nitrate film, designated 5, is positioned between converter films 7 and 9 as shown in the drawing. A film of polyethylene having a thickness of about 0.02 inches was utilized as the converter film. Aluminum back plate 11 having a thickness of about 0.025 inches is attached to the bottom of converter film 9. Polyethylene having a thickness of approximately 0.02 inches is an appropriate and efficient converter film because of its high hydrogen density. The back plate constructed of aluminum, or other low neutron scattering material, may be of any convenient thickness. In addition to polyethylene, metal hydride sheets, e.g., titanium hydride, zirconium hydride and niobium hydride may also be utilized as converter films. The components are held in contact with each other by means of clips, the whole forming the film cassette. Optionally, the converter film may be covered with a protective sheet.

In operation, the cassette is placed adjacent to the object to be radiographed so that the neutrons from the source will case a neutron shadow of the object first upon the converter foil. Elastic scattering of fast neutrons by the nuclei of the hydrogen atoms in the polyethylene film produces protons which travel into the cellulose nitrate, leaving sensitized spikes therein. Some radiation will then penetrate through the cellulose nitrate film and the back. A simple source of neutrons for this purpose is a "point" source of californium-252 which is a self-fissioning radioactive isotope. Radiation directly from the source, i.e., the fission spectrum of neutrons, is utilized. With the source material arranged within a very small volume approximating a point source, no auxilliary collimation is required. Using a 5 mg californium-252 source (total flux = $10^{10}$ neutrons/sec), radiographs have been made after 16 hours of exposure to a $3 \times 10^6$ neutron/cm² sec flux.

When exposure to neutrons is completed, the cellulose nitrate film is etched by suspending it in a 6.5 N sodium hydroxide solution at a temperature of 55°–60°C for a period of about 15 minutes. The film is then washed with clean water and allowed to dry slowly.

The image on the dry film may be viewed by transmitted light with the light source off the viewing axis, preferably with parallel light rays coming from the source. A photograph of the image may be made for further reproduction, or the etched film may be placed in the negative carrier of a photographic enlarger which has been equipped with a point light source near the focal point of the condensing lenses and copied in the usual manner on the easel.

Although we have described our invention with a certain degree of particularity, it is understood that the present disclosure has been made by way of example and that numerous variations may be resorted to without departing from the spirit and scope of the invention as hereinafter claimed.

Having described our invention, we claim:

1. A method for the formation of a permanent visible image of a fast neutron beam on a sheet of plastic comprising a cellulose nitrate film positioned between a hydrogen-containing film and a low neutron scattering support component, said method comprising the steps of a) positioning the plastic film adjacent to an object to be radiographed so that neutrons from the fast neutron source will cast a neutron shadow of the object upon the hydrogen-containing film, b) causing the elastic scattering of fast neutrons by the nuclei of the hydrogen atoms in said hydrogen-containing film to produce protons which travel into the cellulose nitrate film, leaving sensitized spikes therein, and c) etching the proton-sensitized cellulose nitrate film by suspending it in a sodium hydroxide solution to form said visible image in said film.

2. A method in accordance with claim 1 wherein the hydrogen-containing film component is selected from the group consisting of polyethylene, titanium hydride, zirconium hydride, and niobium hydride.

3. A method in accordance with claim 1 wherein the hydrogen-containing film is polyethylene.

4. A method in accordance with claim 1 wherein the low neutron scattering component is aluminum.

* * * * *